United States Patent
Venugopal Minimol et al.

(10) Patent No.: US 12,536,445 B2
(45) Date of Patent: Jan. 27, 2026

(54) METHOD AND SYSTEM FOR EVOLVED SARSA REINFORCEMENT LEARNING FOR FLOW SHOP SCHEDULING

(71) Applicant: Tata Consultancy Services Limited, Mumbai (IN)

(72) Inventors: Pallavi Venugopal Minimol, Pune (IN); Sagar Srinivas Sakhinana, Pune (IN); Venkataramana Runkana, Pune (IN)

(73) Assignee: Tata Consultancy Services Limited, Mumbai (IN)

(*) Notice: Subject to any disclaimer, the term of this patent is extended or adjusted under 35 U.S.C. 154(b) by 616 days.

(21) Appl. No.: 18/071,261

(22) Filed: Nov. 29, 2022

(65) Prior Publication Data
US 2023/0306271 A1 Sep. 28, 2023

(30) Foreign Application Priority Data
Mar. 22, 2022 (IN) .............................. 202221015892

(51) Int. Cl.
G06N 3/092 (2023.01)
G06F 9/50 (2006.01)

(52) U.S. Cl.
CPC .......... *G06N 3/092* (2023.01); *G06F 9/5027* (2013.01)

(58) Field of Classification Search
CPC .............................. G06N 3/092; G06F 9/5027
See application file for complete search history.

(56) References Cited

U.S. PATENT DOCUMENTS

2021/0278825 A1* 9/2021 Wen ................. G05B 19/41865

OTHER PUBLICATIONS

Tassel, "A Reinforcement Learning Environment for Job-Shop Scheduling" (Year: 2021).*
Cong Zhang "Learning to Dispatch for Job Shop Scheduling via Deep Reinforcement Learning" (Year: 2020).*
Chen et al., "A self-learning genetic algorithm based on reinforcement learning for flexible job-shop scheduling problem," Computers & Industrial Engineering 149(106778) (2020).
(Continued)

*Primary Examiner* — Van C Mang
(74) *Attorney, Agent, or Firm* — Finnegan, Henderson, Farabow, Garrett & Dunner, LLP

(57) ABSTRACT

Flow Shop Scheduling Problems (FSSP) solved using combination of Reinforcement Learning (RL), Genetic Algorithm (GA) and Heuristics is effective if can provide makespan as minimum as possible. Embodiments herein provide a method and system for evolved State-Action-Reward-State-Action (evolved SARSA) RL for flow shop scheduling, which is a hybrid framework of hierarchical RL with evolutionary techniques and heuristics method to solve FSSP. An optimum job sequence is estimated that minimizes the makespan thereby achieving maximum utilization of the resources. The evolutionary and heuristics strategy is applied in a reinforced way of learning for estimating the optimal schedule. The framework refines FSSP solution provided by Reinforced-SARSA (R-SARSA) using the evolutionary Genetic Algorithms (GAs), which is further guided by heuristic in moving towards the optimal solutions and prevents from being stuck at a local optimum.

6 Claims, 11 Drawing Sheets

(56) References Cited

OTHER PUBLICATIONS

Chien et al., "Agent-based approach integrating deep reinforcement learning and hybrid genetic algorithm for dynamic scheduling for Industry 3.5 smart problem," Computers & Industrial Engineering 162(107782) (2021).
Pan et al., "A Novel Evolutionary Algorithm with Adaptation Mechanism for Fuzzy Permutation Flow-Shop Scheduling," (2021).

* cited by examiner

METHOD AND SYSTEM FOR EVOLVED SARSA REINFORCEMENT LEARNING FOR FLOW SHOP SCHEDULING

PRIORITY CLAIM

This U.S. patent application claims priority under 35 U.S.C. § 119 to: Indian Patent Application No. 202221015892, filed on Mar. 22, 2022. The entire contents of the aforementioned application are incorporated herein by reference.

TECHNICAL FIELD

The embodiments herein aenerally relate to flow shop scheduling and, more particularly, to a method and system for evolved State-Action-Reward-State-Action (evolved SARSA) reinforcement learning for flow shop scheduling.

BACKGROUND

Scheduling refers to the method used to allocate valuable resources to achieve the target for various applications. Various components of scheduling problems include tasks, resources, constraints and objective function where the task is the entity to be scheduled. When jobs are tasks and machines are the resources, it is called a shop scheduling problem. Various types of shop scheduling problems include single machine scheduling problems with single processors, single machine scheduling problems with parallel processors, Job Shop Scheduling Problems(JSSP) and Flow Shop Scheduling Problems(FSSP). Recently, FSSP seems to be very significant in the field of industrial production and is proved to be a non-deterministic polynomial-time(NP)-hard problem. Flow shop scheduling refers to recommending a best job sequence for n number of jobs to be executed by m number of machines such that the makespan is minimum, enabling efficient resource usage. Makespan is the length of time that elapses from the start of work to for n jobs using m machines.

Different approaches in literature attempting to solve FSSP include Reinforcement Learning (RL), Genetic Algorithm (GA) and Heuristics solutions, which have been used individually, and each approach has its own limitations. Attempts have been made towards combining two different approaches to improve the solution. However, the manner in which the different techniques are integrated is critical to achieve the minimum makespan.

SUMMARY

Embodiments of the present disclosure present technological improvements as solutions to one or more of the above-mentioned technical problems recognized by the inventors in conventional systems. For example, in one embodiment, a method for evolved State-Action-Reward-State-Action (evolved SARSA) reinforcement learning for flow shop scheduling is provided. The method includes receiving a plurality of jobs to be sequenced during flow shop scheduling on a plurality of machines. Further, the method includes obtaining an optimum job sequence for the plurality of jobs that has a minimum makespan, by iteratively performing steps comprising: (A) obtaining via a Reinforced State-Action-Reward-State-Action (R-SARSA) learning module a current job sequence of the plurality of jobs. (B) Identifying the current job sequence as a best job sequence if a current makespan estimated for the current job sequence is less than a preceding makespan computed for a previous iteration. The current makespan is identified as a best makespan, and if the current makespan is greater than the preceding makespan, a policy learnt by the R-SARSA learning module in the previous iteration is unlearnt and is assigned a penalty for a reward to prevent from drifting away from obtaining the optimum job sequence, and wherein a first makespan estimated in a first iteration is compared with an initial preset best makespan. (C) Storing the identified best job sequence in a repository, wherein the repository stores a plurality of best sequences identified in each iteration. (D) Generating via an evolutionary crossover module a plurality parent job sequence pairs, randomly picked from the plurality of best sequences. (E) Processing via the evolutionary crossover module each of the plurality of parent job sequence pairs, to generate a plurality of evolved job sequences using genetic operators that switch one or more jobs between each pair of the plurality of parent job sequence pairs, wherein the one or more jobs are associated with N randomly selected positions in a job sequence of each pair among the parent job sequence pairs. (F) Applying a mutation technique, via a mutation module executed by the one or more hardware processors, on the plurality of evolved job sequences to generate a plurality of mutated job sequences by shifting k random positions of one or more jobs within each of the plurality of evolved job sequences. (G) Identifying a job sequence as the optimum job sequence from among the plurality of parent job sequence pairs and the plurality of mutated job sequences that has the minimum makespan, wherein a policy of the R-SARSA learning module is updated accordingly if the optimum job sequence is different than the best job sequence identified by the R-SARSA learning module, and wherein the best makespan is greater than the minimum makespan.

Further, the method includes applying minor perturbations to the optimum job sequence, via a heuristics module to generate a set of neighbor job sequences. Furthermore, the method includes evaluating a neighbor makespan of each of the set of neighbor job sequences in accordance with pre-defined heuristic criteria. If a minimum neighbor makespan among the neighbor makespan evaluated for each of the set of neighbors is constant for past predefined iterations, then a temperature parameter of the heuristics module is reset to half of an initial value, which prevents the optimum job sequence from being stuck at a local optimum and enables the optimum job sequence to reach a global optimum In another aspect, a system for evolved State-action-reward-state-action (evolved SARSA) reinforcement learning for flow shop scheduling is provided. The system comprises a memory storing instructions; one or more Input/Output (I/O) interfaces; and one or more hardware processors coupled to the memory via the one or more I/O interfaces, wherein the one or more hardware processors are configured by the instructions to receive a plurality of jobs to be sequenced during flow shop scheduling on a plurality of machines. Further, the one or more hardware processors are configured to obtain an optimum job sequence for the plurality of jobs that has a minimum makespan, by iteratively performing steps comprising: (A) obtaining via a Reinforced State-Action-Reward-State-Action (R-SARSA) learning module a current job sequence of the plurality of jobs. (B) Identifying the current job sequence as a best job sequence if a current makespan estimated for the current job sequence is less than a preceding makespan computed for a previous iteration. The current makespan is identified as a best makespan, and if the current makespan is greater than the preceding makespan, a policy learnt by the R-SARSA learning module in the previous iteration is unlearnt and is assigned a penalty for a reward to prevent from drifting away from obtaining the optimum job sequence, and wherein a first makespan estimated in a first iteration is compared with an initial preset best makespan. (C) Storing the identified best job sequence in a repository, wherein the repository stores a plurality of best sequences identified in each iteration. (D) Generating via an evolutionary crossover module a plurality parent job sequence pairs, randomly picked from the plurality of best sequences. (E) Processing via the evolutionary crossover module each of the plurality of parent job sequence pairs, to generate a plurality of evolved job sequences using genetic operators that switch one or more jobs between each pair of the plurality of parent job sequence pairs, wherein the one or more jobs are associated with N randomly selected positions in a job sequence of each pair among the parent job sequence pairs. (F) Applying a mutation technique, via a mutation module executed by the one or more hardware processors, on the plurality of evolved job sequences to generate a plurality of mutated job sequences by shifting k random positions of one or more jobs within each of the plurality of evolved job sequences. (G) Identifying a job sequence as the optimum job sequence from among the plurality of parent job sequence pairs and the plurality of mutated job sequences that has the minimum makespan, wherein a policy of the R-SARSA learning module is updated accordingly if the optimum job sequence is different than the best job sequence identified by the R-SARSA learning module, and wherein the best makespan is greater than the minimum makespan.

Further, the one or more hardware processors are configured to apply minor perturbations to the optimum job sequence, via a heuristics module to generate a set of neighbor job sequences. Furthermore, the one or more hardware processors are configured to evaluate a neighbor makespan of each of the set of neighbor job sequences in accordance with predefined heuristic criteria. If a minimum neighbor makespan among the neighbor makespan evaluated for each of the set of neighbors is constant for past predefined iterations, then a temperature parameter of the heuristics module is reset to half of an initial value, which prevents the optimum job sequence from being stuck at a local optimum and enables the optimum job sequence to reach a global optimum.

In yet another aspect, there are provided one or more non-transitory machine-readable information storage mediums comprising one or more instructions, which when executed by one or more hardware processors causes a method for evolved State-action-reward-state-action (evolved SARSA) reinforcement learning for flow shop scheduling. The method includes receiving a plurality of jobs to be sequenced during flow shop scheduling on a plurality of machines. Further, the method includes obtaining an optimum job sequence for the plurality of jobs that has a minimum makespan, by iteratively performing steps comprising: (A) obtaining via a Reinforced State-Action-Reward-State-Action (R-SARSA) learning module a current job sequence of the plurality of jobs. (B) identifying the current job sequence as a best job sequence if a current makespan estimated for the current job sequence is less than a preceding makespan computed for a previous iteration. The current makespan is identified as a best makespan, and if the current makespan is greater than the preceding makespan, a policy learnt by the R-SARSA learning module in the previous iteration is unlearnt and is assigned a penalty for a reward to prevent from drifting away from obtaining the optimum job sequence, and wherein a first makespan estimated in a first iteration is compared with an initial preset best makespan. (C) Storing the identified best job sequence in a repository, wherein the repository stores a plurality of best sequences identified in each iteration. (D) Generating via an evolutionary crossover module a plurality parent job sequence pairs, randomly picked from the plurality of best sequences. (E) Processing via the evolutionary crossover module each of the plurality of parent job sequence pairs, to generate a plurality of evolved job sequences using genetic operators that switch one or more jobs between each pair of the plurality of parent job sequence pairs, wherein the one or more jobs are associated with N randomly selected positions in a job sequence of each pair among the parent job sequence pairs. (F) Applying a mutation technique, via a mutation module executed by the one or more hardware processors, on the plurality of evolved job sequences to generate a plurality of mutated job sequences by shifting k random positions of one or more jobs within each of the plurality of evolved job sequences. (G) Identifying a job sequence as the optimum job sequence from among the plurality of parent job sequence pairs and the plurality of mutated job sequences that has the minimum makespan, wherein a policy of the R-SARSA learning module is updated accordingly if the optimum job sequence is different than the best job sequence identified by the R-SARSA learning module, and wherein the best makespan is greater than the minimum makespan.

Further, the method includes applying minor perturbations to the optimum job sequence, via a heuristics module to generate a set of neighbor job sequences. Furthermore, the method includes evaluating a neighbor makespan of each of the set of neighbor job sequences in accordance with predefined heuristic criteria. If a minimum neighbor makespan among the neighbor makespan evaluated for each of the set of neighbors is constant for past predefined iterations, then a temperature parameter of the heuristics module is reset to half of an initial value, which prevents the optimum job sequence from being stuck at a local optimum and enables the optimum job sequence to reach a global optimum.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1A:
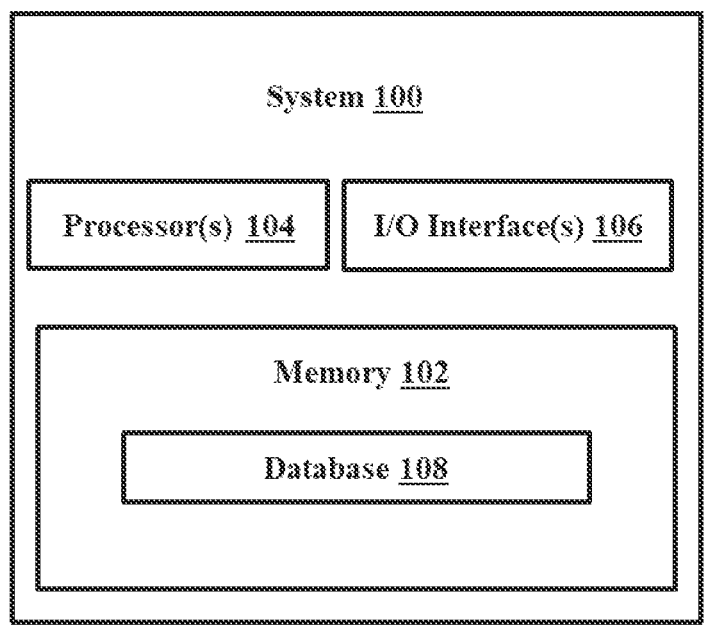
FIG. 1A is a functional block diagram of a system for evolved State-action-reward-state-action (evolved SARSA) reinforcement learning for flow shop scheduling, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments of the present disclosure provide a method and system for evolved State-Action-Reward-State-Action (evolved SARSA) Reinforcement Learning (RL) for flow shop scheduling. The system, also referred to as evolved SARSA, is a hybrid framework of hierarchical RL with evolutionary techniques and heuristics method to solve Flow Shop Scheduling Problems (FSSP). The system estimates an optimum job sequence for FSSP that minimizes the makespan, thereby achieving maximum utilization of the resources. This forms a non-deterministic-polynomial-time (NP)-hard combinatorial optimization problem. Evolutionary and heuristics strategy is applied in a reinforced way of learning for estimating the optimal schedule. The framework refines FSSP solution provided by Reinforced-SARSA (R-SARSA) using the evolutionary Genetic Algorithms (GAs), which is further guided by heuristic in moving towards the optimal solutions and prevents from being stuck at a local optimum. In scheduling problems, as a reward can be estimated only at the end of the episode, a hierarchical approach on the standard RL has been adopted. A modified implementation of the RL, the evolved SARSA, consists of a two-step updation policy where the job sequence estimated in the initial step is used to update the policy without reward followed by the second step where the overall reward estimated is used to update the policy for all the intermediate steps.

As mentioned, combinational techniques have been attempted solve Flow Shop Scheduling Problems(FSSP). In the work "Agent-based approach integrating deep reinforcement learning and hybrid genetic algorithm for dynamic scheduling for industry 3.5 smart production" by Chen-Fu Chien et.al, Reinforcement Learning (RL) and Hybrid Genetic algorithm (HGA) are used in parallel in each episode, wherein the HGA acts as an optimizer. Further, if HGA is good in providing a better job sequence with lower makespan, then it is used to train the RL. Thus, HGA plays a secondary or supporting role. Unlike the existing work, the method and system disclosed herein, the GA step works on top of RL-learned best schedule and if it provides a better solution for the FSSP, it is used as feedback to update the policy of RL. Moreover, there is no reference to usage of Heuristics to further enhance the solution.

In another existing work "A self-learning genetic algorithm based on reinforcement learning for flexible job-shop scheduling problem" by Ronghua Chen et al. the work describes RL and GA in combination, where GA is used to estimate the best sequence, while Pm (mutation probability) and Pc (crossover probability) parameters which are required within the process of GA is estimated from the RL. Thus, RL has no direct contribution in determining best job sequence. The existing work refers to feedback, which is purely for the values of Pm and Pc which are used in the next iteration, whereas the feedback mechanism disclosed by the method updates the policy which is retained throughout the solution estimation.

Another work in literature "A Novel Evolutionary Algorithm with Adaptation Mechanism for Fuzzy Permutation Flow-Shop Scheduling" by Zi-Xiao Pan et.al, combines Heuristics with RL, wherein two strategies based on NEH heuristics are used to generate the initial population for RL. Further, for evolution phase multiple local operators are collaboratively used based on the feedback of the performance. There is no feedback given to the policy of the RL based on the sequence estimated unlike the method disclosed herein. Further, in the method disclosed herein, best sequences from the RL, saved in memory, are used as the initial populations while heuristics is used to guide the system in moving towards the optimal solutions and prevents from being stuck at a local optimum.

Referring now to the drawings, and more particularly to FIGS. 1A through 8, where similar reference characters denote corresponding features consistently throughout the figures, there are shown preferred embodiments and these embodiments are described in the context of the following exemplary system and/or method.

FIG. 1A is a functional block diagram of a system for evolved State-action-reward-state-action (SARSA) reinforcement learning for flow shop scheduling, in accordance with some embodiments of the present disclosure.

In an embodiment, the system 100, interchangeably referred herein as evolved SARSA system, includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like, and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices. The system 100, vial the interface provided to the user can receive inputs such number of job and a number of machines in for flow shop scheduling.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 1B:
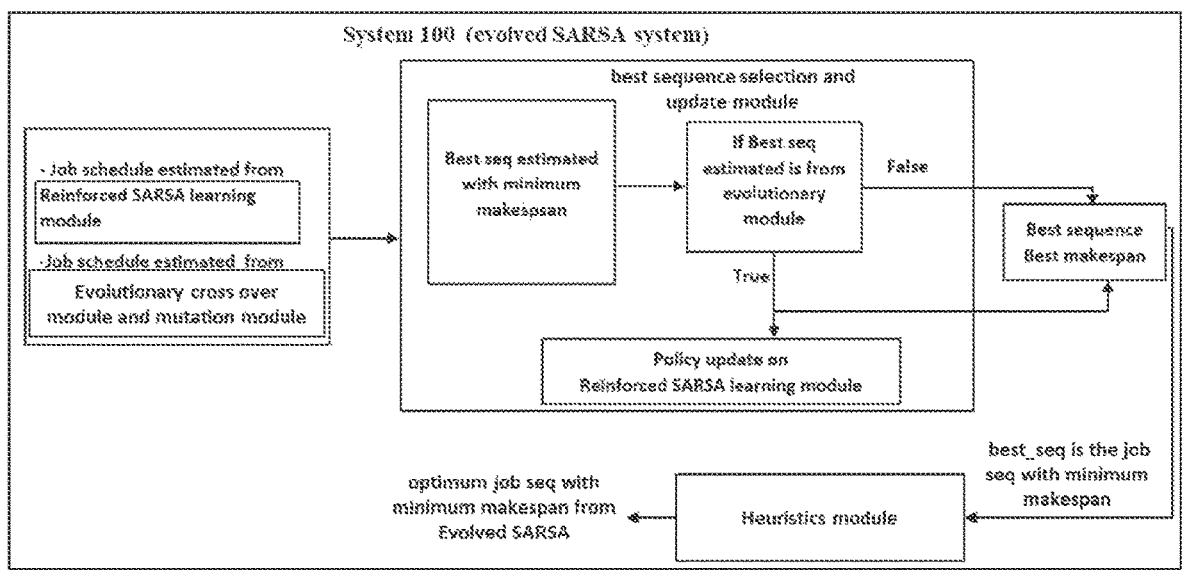
FIG. 1B illustrates an architectural overview of the system of FIG. 1, in accordance with some embodiments of the present disclosure.

Further, the memory 102 includes modules such as Reinforced State-Action-Reward-State-Action (R-SARSA) learning module, an evolutionary crossover module, a mutation module, a best sequence selection and update module, and a heuristics module as depicted in the architectural overview of the system 100 in FIG. 1B. The R-SARSA, the evolutionary GA provided by the evolutionary crossover module and the mutation module, guided by the heuristic module, provides the evolved SARSA hybrid integration framework, wherein each technique contributes to refine and optimize the FSSP solution at multiple levels of the hierarchy to provide the best possible optimization in flow shop scheduling.

Further, the memory 102 includes a database 108 that stores in formation associated with received jobs and machine in context of flow shop scheduling. The database may also include a repository that stores the various job sequences and corresponding makespans generated by one or more modules of the system 100. In an embodiment, the database 108 may be external (not shown) to the system 100 and coupled to the system via the I/O interface 106. Further, the memory 102 may comprise information pertaining to input(s)/output(s) of each step performed by the processor(s) 104 of the system 100 and methods of the present disclosure. Functions of the components of the system 100 are explained in conjunction with flow diagram of FIG. 2 and evolutionary crossover modules and the mutation modules explained with examples of FIG. 3 and FIG. 4.

Figure 2A:
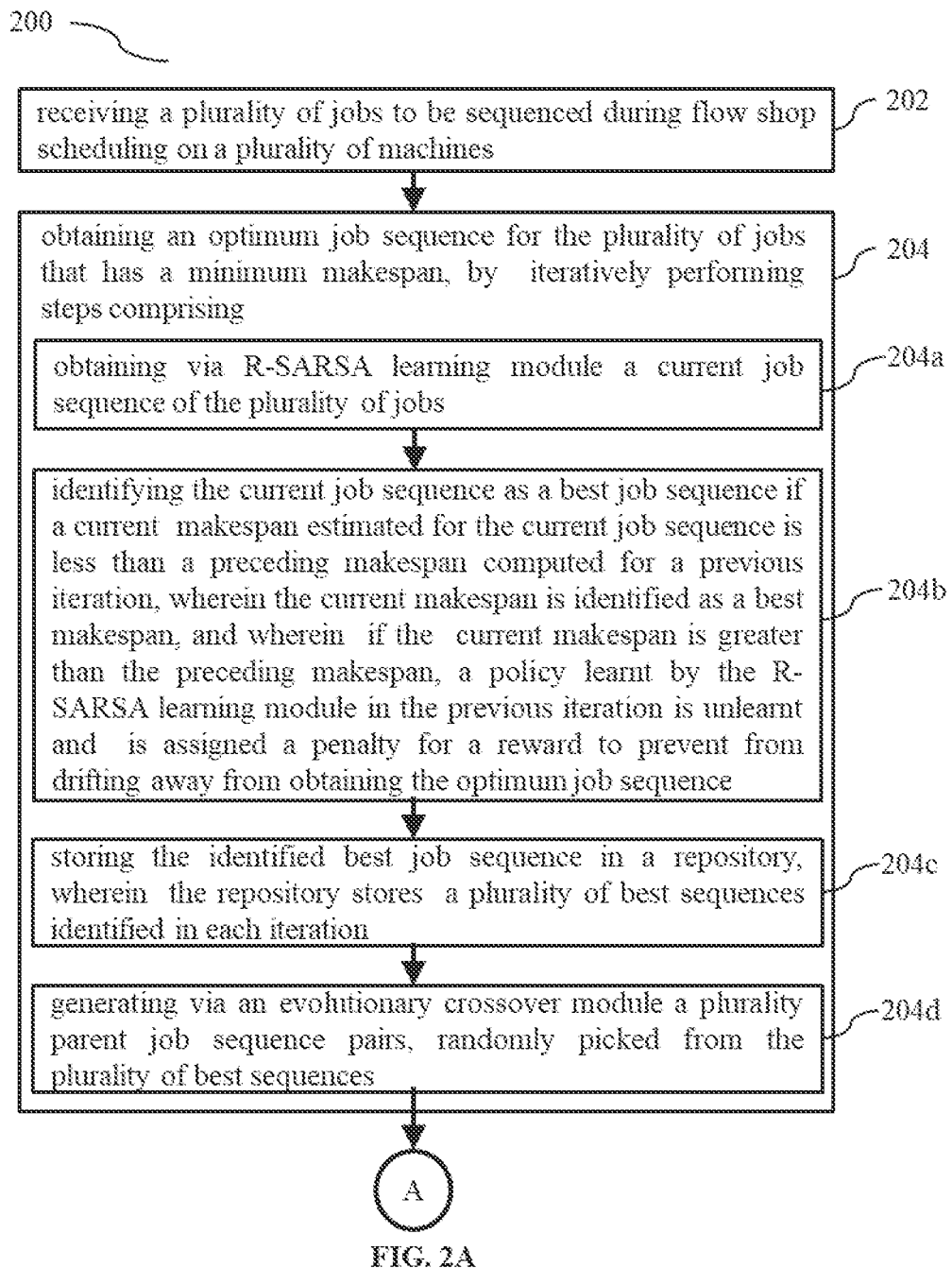
FIGS. 2A through 2C (collectively referred as FIG. 2) is a flow diagram illustrating a method for evolved SARSA reinforcement learning for flow shop scheduling, using the system of FIG. 1, in accordance with some embodiments of the present disclosure.
Figure 2B:
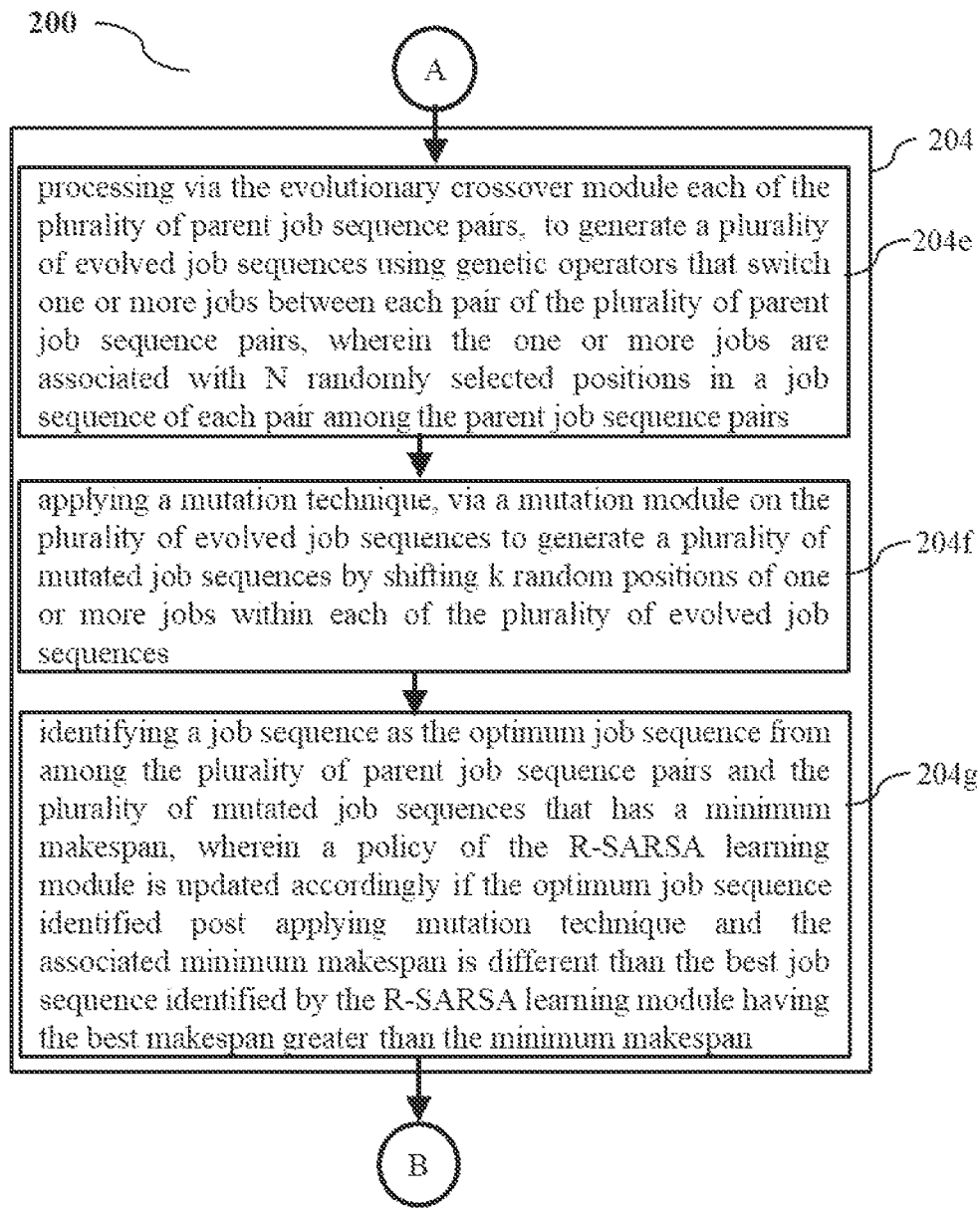
Figure 2C:
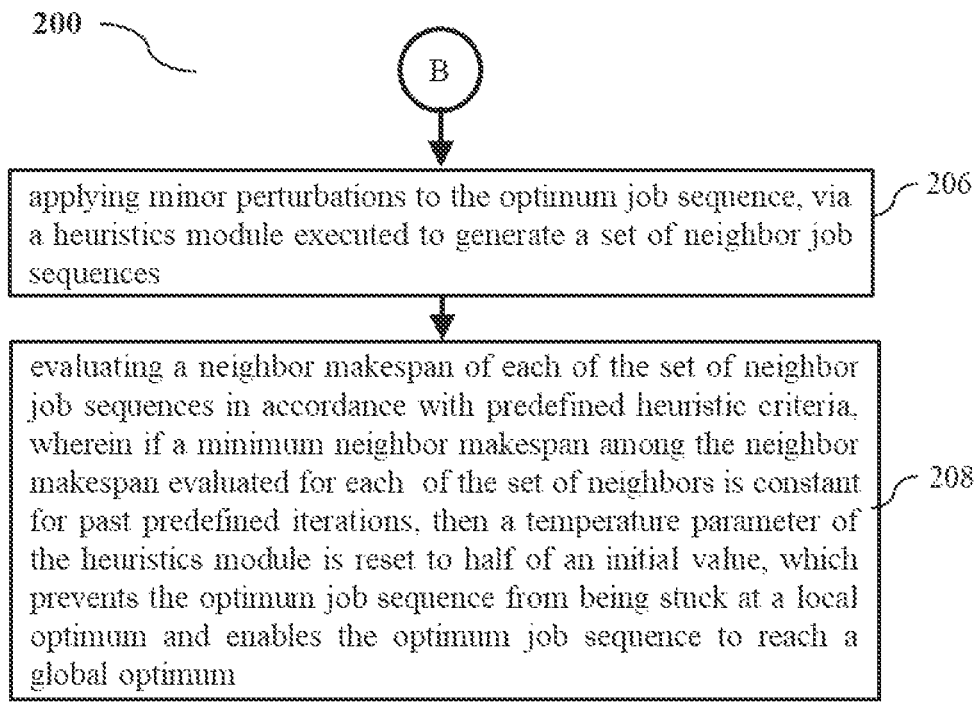
Figure 3:
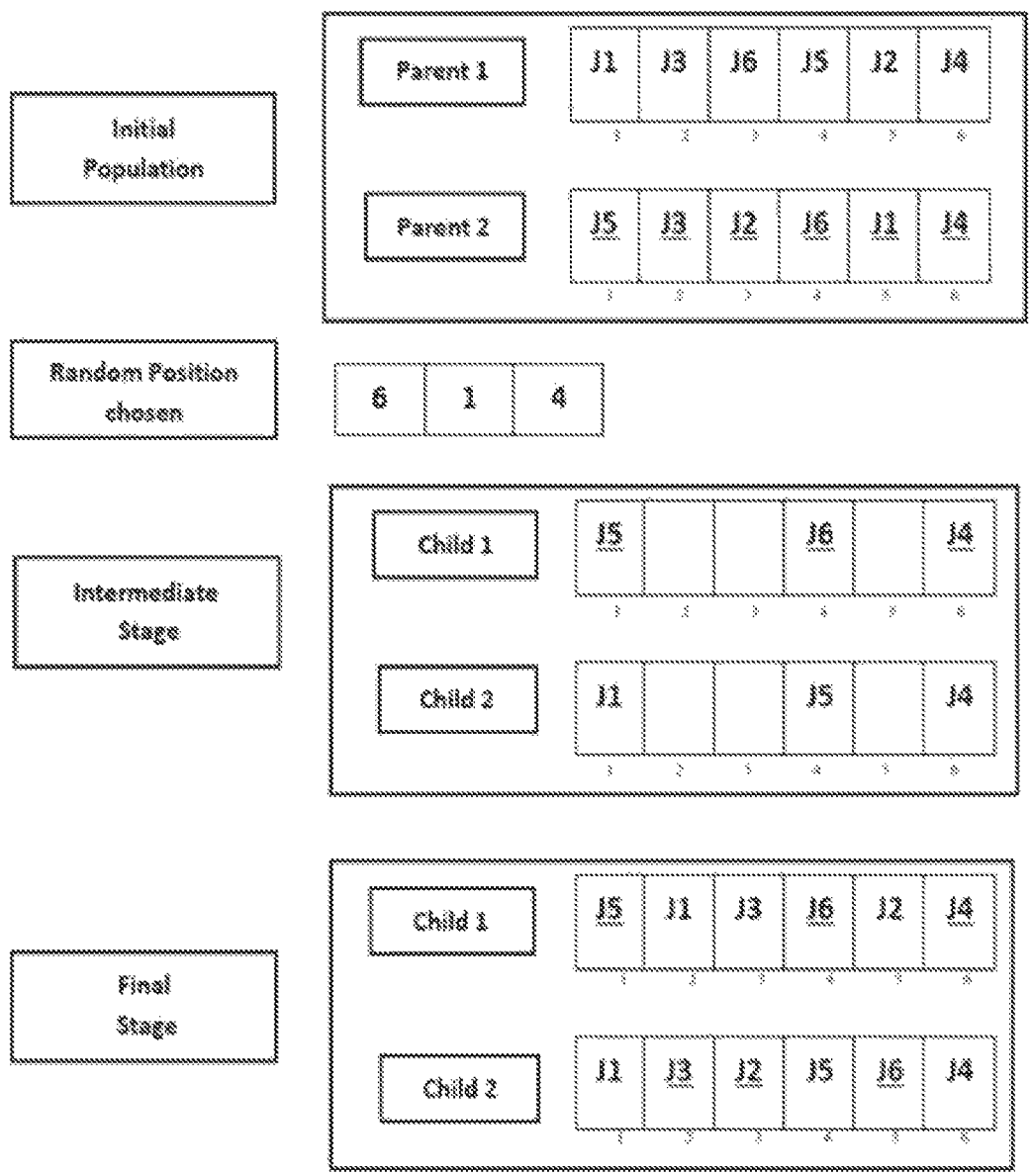
FIG. 3 is an example illustration of an evolutionary crossover module among modules of the system of FIG. 1 for generating an optimum job sequence for the flow shop scheduling, in accordance with some embodiments of the present disclosure.

FIGS. 2A through 2C (collectively referred as FIG. 2) is a flow diagram illustrating a method 200 for evolved SARSA reinforcement learning for flow shop scheduling, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2 with help of pseudocode in Algorithm 1 provided below after step 208 of the method 200. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

PROBLEM DESCRIPTION: Flow shop scheduling refers to the process where a set of n jobs $\{J_1, J_2, J_3, \ldots J_n\}$ have to be scheduled across m machines $\{M_1, M_2, M_3, \ldots M_m\}$. Each job, Ji where i∈ {1, 2, 3 . . . n} contains m tasks that need to be executed sequentially across m machines such that the $j^{th}$ task of the job is executed on the $j^{th}$ machine where j∈ {1, 2, 3 . . . m}. For example, in flow shop all the jobs $J_1, J_2, J_3$ are required to process through the sequence $M_1 \rightarrow M_2 \rightarrow M_3$. The processing order of execution of the task for every job across the machine is the same, however, the processing time, $p_{ij}$ for each job, i across each machine, j may be different. A single task can be executed only by a single machine at any given time. No task for the job can be initiated until the previous task of the job is completed. A single machine can take only a single task at a time. It is assumed that from the initial time all machines are available for processing. The total time taken by each job, i to complete the entire task is referred to as the completion time, $C_i$.

$$C_i = \Sigma_{j=1}^{m} p_{ij} \forall i \in \{1,2,3, \ldots n\} \quad (1)$$

The total time taken by the jobs to complete the schedule is referred to as makespan $C_{max}$.

$$C_{max} = \max_{0 \le i \le n} C_i \quad (2)$$

$C_{max}$, is the time taken by the last job to perform the last operation. The objective here is to estimate the optimal sequence of the jobs to be executed across machines by efficient utilization of the resources. Among the different objective functions available for scheduling problems like minimizing the flow time, earliness or tardiness, idle time, etc. the method herein considers minimizing the makespan as the objective.

$$\min (C_{max}) = \min_{1 \le i \le n} \left( \Sigma_{j=1}^{m} p_{ij} \right) \quad (3)$$

Referring to the steps of the method 200, at step 202 of the method 200, the one or more hardware processors 104 receive a plurality of jobs to be sequenced during flow shop scheduling on a plurality of machines. As stated in the problem definition in equation 3, further at step 204, the one or more hardware processors 104 solve the problem to obtain, an optimum job sequence for the plurality of jobs that has a minimum makespan. Obtaining the optimum job sequence is an iterative process explained in conjunction with steps 204a through 204g.

At step 204a, the R-SARSA learning module executed by the one or more hardware processors 104 obtains, a current job sequence of the plurality of jobs. Thereafter, at step 204b, the one or more hardware processors 104 identify the current job sequence as a best job sequence, if a current makespan estimated for the current job sequence is less than a preceding makespan computed for a previous iteration. Thus, the current makespan associated with the current job sequence is identified as a best makespan. However, if the current makespan is greater than the preceding makespan, a policy learnt by the R-SARSA learning module in the previous iteration is unlearnt and is assigned a penalty of a reward to prevent from drifting away from obtaining the optimum job sequence. It can be noted that a first makespan estimated in a first iteration is compared with an initial preset best makespan, which is a large positive number (Algorithm 1, line 5). Thus, the first makespan is always less than the initial preset best makespan and unlearning of the R-SARSA learning module in first the iteration is not triggered.

The reinforcement learning used by the R-SARSA learning module is explained below. It utilizes Q-Learning or Q-value iteration, which is an off-policy temporal difference (TD) algorithm, well known in the art, and is defined by equation 4 below:

$$Q(s_t, a_r) = Q(s_t, a_t) + \alpha \left[ R_{t+1} + \gamma \max_a Q(s_{t+1}, a) - Q(s_t, a_t) \right] \quad (4)$$

where $\alpha$ is the learning rate and $\gamma$ is the discount factor. Q-Learning takes the discounted difference between the maximum Q-value corresponding to the next state and the current state-action Q-value i.e., it uses only the next state and current action for the TD update. Since the flow shop scheduling problem can be easily modeled, it is convenient to mathematically formulate the problem to minimize the makespan and estimate the optimal sequence of the jobs. The major part is in formulating a rewarding policy (greater reward for minimal makespan) and giving it as feedback to the agent of the RL framework to adapt. RL can also be solved using various discrete algorithms like State-Action-Reward-State-Action(SARSA), Deep-Q-Network(DQN) or a continuous algorithm like Deep Deterministic Policy Gradient (DDPG). Since FSSP has a discrete state-action space and the optimal strategy purely depends on the data, Q-learning is highly affected by the sample quality which affects the convergence. However, SARSA learns the optimal strategy, explores the optimal solution and performs exploration resulting in a smooth learning process. Thus, herein SARSA is chosen for solving the FSSP problem and implemented via the R-SARSA learning module. In FSSP, the initial state is the set of jobs to be executed. Once the action is estimated the new state is the set of remaining jobs to be executed. The agent chooses the action by either exploration or exploitation using the $\varepsilon$-greedy technique using random number generation as described in work in literature.

In the method 200 disclosed herein, the $\varepsilon$ probability is initiated with a high value which decays over time, based on the decay factor, i.e., $\varepsilon$=decay factor×$\varepsilon$. Further, the method 200 defines the reward as $\lambda$ times the inverse of the makespan as the objective is to minimize the overall makespan.

$$R = \frac{\lambda}{\text{makespan}} \quad (5)$$

SARSA is an on-policy TD algorithm that takes the discounted difference between the Q-value corresponding to the next state-action and the current state-action as defined by $$Q(s_t, a_t) = Q(s_t, a_t) + \alpha[R_{t+1} + \gamma Q(s_{t+1}, a_{t+1}) - Q(s_t, a_t)] \quad (6)$$

where $\alpha$ is the learning rate and $\gamma$ is the discount factor. As the actions from SARSA are purely based on exploration or exploitation, it does not perform an exhaustive search to determine the best solution. This can result in a sub-optimal solution. Thus, the system 100 provides a framework motivated by the evolutionary GA and heuristics approach over the explored and exploited solution from the SARSA to expand the solution search. Thus, the evolutionary cross over module and the mutation module described with steps 204d through 204f explain the evolutionary GA, and the heuristic module is explained through steps 206 and 208. As depicted in FIG. 1B, the modules of the evolved SARSA system (system 100) include the R-SARSA learning module, the evolutionary crossover module, the mutation module, the best sequence selection and update module and the heuristics module. The system 100 utilizes the reinforced way of learning the evolutionary and heuristics approach for solving any combinatorial optimization problem. In the R-SARSA module, a solution to the defined problem in equation 3 estimated in every episode is compared against the best solution to validate if the episodic step is moving towards the best solution and thus give feedback to agent of the R-SARSA module. This helps in achieving the target in an evolutionary manner by learning from sub-optimum solutions thereby achieving the global optimum solutions.

Consider FSSP with n jobs and m machines. In the R-SARSA learning module Q-table is initialized with $2^n$ states where n is the total number of jobs and the variable, best makespan with a very large positive number. For every episodic evaluation, the state $s_t$ is initialized with all the jobs i.e., $s_t=[1, 2, 3 \ldots n]$ and $\varepsilon$ is decayed by decay factor. Based on exploration or exploitation, the agent chooses action $a_t$ which is the next job to be performed in sequence. For each iteration, the environment estimates the next state $s_{t+1}$ which is the set of all jobs except those jobs which are provided as actions by the agent. The reward is the inverse of the makespan as mentioned in equation 5 above. The reward R can be evaluated only at the episodic end. Hence, a hierarchical approach of the two-step updation policy disclosed herein is used where at first step the Q(s, a) is estimated using the updated equation 7 below, where no reward is assigned until the entire job sequence is estimated for that episode (Steps 2-16 of Algorithm 1)

$$Q(s_t, a_t)=Q(s_t, a_t)+\alpha[\gamma Q(s_{t+1}, a_{t+1})-Q(s_t, a_t)] \quad (7)$$

Further at second step, once the learning episode reaches the end, the reward estimated is used to update the policy in accordance with predefined criteria, which is based on the current makespan of the current job sequence. Refer lines 18-21, and 43-48 of Algorithm 1. The reward is computed based on equation 5, wherein the makespsan in equation 5 is the current makespan. At step 204c, the one or more hardware processors 104, store the identified best job sequence in a repository. Thus, the job sequences estimated from each episode (each iteration) of the R-SARSA learning module are stored in the repository in the memory 102 as candidate solutions to utilize for the process of evolution. For every episode of the reinforced SARSA learning module, if the makespan estimated is lesser than the best makespan, all the intermediate steps of the episode are updated using equation 8 below.

$$Q(s_t, a_t)=R \times Q(s_t, a_t) \quad (8)$$

Once the R-SARSA learning module identifies the best job sequences, at previous step 204c, the evolutionary crossover module is triggered, else updating of the R-SARSA module as per equation 7 is revoked and the appropriate reward is given as feedback to the agent (step 43-49 of Algorithm 1). Thus, the policy does not move away from the obtained sub-optimal solution.

At step 204d, the evolutionary crossover module executed by the one or more hardware processors 104 generates a plurality parent job sequence pairs, randomly picked from the plurality of best sequences stored in the repository. At step 204e the evolutionary crossover module processes each of the plurality of parent job sequence pairs, to generate a plurality of evolved job sequences using genetic operators that switch one or more jobs between each pair of the plurality of parent job sequence pairs. The one or more jobs are associated with N randomly selected positions in a job sequence of each pair among the parent job sequence pairs. An example depicted in FIG. 3, explains the actions of the evolutionary cross over module. In the evolutionary crossover module, each of the candidate solutions (estimated best job sequences), also referred to as chromosomes, from memory are encoded as the possible set of job sequences such as $J_1, J_2 \ldots J_{n-1}, J_n$. Each candidate solution has been exposed to crossover where it considers two random job sequences or populations and produces two new child populations. During the crossover operation, two of the chromosomes were randomly chosen and [n/2] jobs (or genes) from random locations are interchanged to form two child chromosomes. The jobs from the parent chromosomes that were not a part of the respective child chromosome is estimated to fill the leftover location of the child chromosomes (Steps 22-24 of Algorithm 1). This action provides the evolved job sequences.

Figure 4:
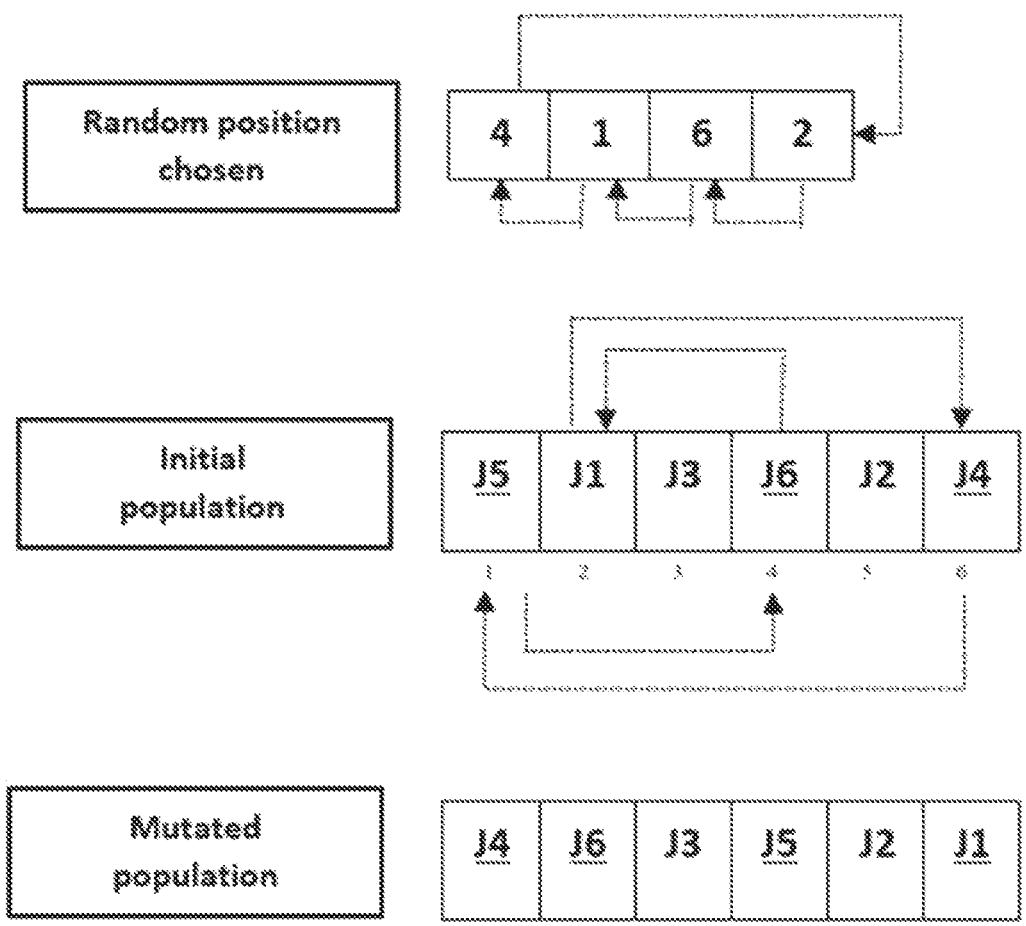
FIG. 4 is an example illustration of a mutation module among the modules of the system of FIG. 1 for generating the optimum job sequence for the flow shop scheduling, in accordance with some embodiments of the present disclosure.

At step 204f, a mutation technique is applied via the mutation module executed by the one or ore hardware processors 104, on the plurality of evolved job sequences to generate a plurality of mutated job sequences by shifting k random positions of one or more jobs within each of the plurality of evolved job sequences. As depicted in FIG. 4, the solutions from the evolutionary crossover module are exposed to the mutation module where k random positions of job sequence were chosen. The jobs corresponding to each of these positions is shifted sequentially to produce the plurality of mutated job sequences (Steps 25-27 of Algorithm 1).

At step 204g, as depicted in the best job sequence module of FIG. 1B, a job sequence is identified as the optimum job sequence from among the plurality of parent job sequence pairs and the plurality of mutated job sequences that has the minimum makespan. Further, the policy of the R-SARSA learning module is updated accordingly if the optimum job sequence is different than the best job sequence identified by the R-SARSA learning module, wherein the best makespan is greater than the minimum makespan.

Once the optimum job sequence is identified, at step 206 of the method 200, the heuristics module executed by the one or more hardware processors applies minor perturbations to the optimum job sequence to generate a set of neighbor job sequences. At step 208 of the method 200, the heuristics module executed by the one or more hardware processors evaluates a neighbor makespan of each of the set of neighbor job sequences in accordance with predefined heuristic criteria. If a minimum neighbor makespan among the neighbor makespan evaluated for each of the set of neighbors is constant for past predefined iterations, then a temperature parameter of the heuristics module is reset to half of an initial value, which prevents the optimum job sequence from being stuck at the local optimum and reach the global optimum. The heuristics module starts from a higher initial temperature, T and randomly finds the optimal makespan by decreasing the temperature simultaneously at a particular annealing rate, $\beta$. For the system 100, the temperature is chosen based on the approximate current makespan. For every iteration k, slight perturbations are given to generate the neighborhood (set of neighbor job sequences, also referred to as neighbors). Let $\phi$ be the difference between the current minimum makespan ($C_k$) among the neighbors and the prior best makespan. If $\phi$ is greater than 0, an update on best makespan is carried out with a probability calculated of $e^{-\phi}/T$ known as acceptance rejection criteria (predefined heuristic criteria). If the perturbation is accepted, the new makespan is considered as the best makespan (Steps 53-63 in Algorithm 1). However, the system 100, retains in the repository (memory 102) all the makespan estimated over the iterations. Reiterating, when, temperature T decreases over iterations, the chances of acceptance of perturbations decreases. Hence, $C_k$ estimated can be constant for the past many iterations. If $C_k$ is constant and greater than the best makespan for past t iterations, as mentioned above the system 100 resets T with half of the initial value to improve the chances of acceptance (Steps 64-67 of Algorithm 1). The process continues till the upper limit on iteration, or the termination criteria is reached.

The pseudocoele of the evolved SARSA is as shown in Algorithm 1.

| Algorithm 1 evolved SARSA for solving FSSP |
|---|
| 1: Reinforced SARSA learning module: |
| 2: Initialize: |
| 3: $Q(s_t, a_t) = 1 \ \forall \ s_t \in S; a_t \in A$ |
| 4: $\epsilon$ ; $Q_{copy}$ = empty; $Q_{final\_ref}$ = empty |
| 5: best_makespan = large positive number ; best_seq = [ ] |
| 6: repeat for each episode: |
| 7: $\epsilon$ = decay factor $\times \epsilon$ |
| 8: Initialize: state $s_t$ with all jobs; job_seq: JSeq = [ ] |
| 9: Choose action $a_t$ based on $\epsilon$-greedy |
| 10: repeat for each step t |
| 11: JSeq ← JSeq + $a_t$; Estimate $s_{t+1}$ based on $a_t$ |
| 12: $Q_{copy}(s_t, a_t)$ ← $Q(s_t, a_t)$ |
| 13: Choose $a_{t+1}$ for $s_{t+1}$ based on $\epsilon$-greedy |
| 14: $Q(s_t, a_t) = Q(s_t, a_t) + \alpha[\gamma Q(s_{t+1}, a_{t+1}) - Q(s_t, a_t)]$ |
| 15: $s_t \leftarrow s_{t+1}; a_t \leftarrow a_{t+1}$ |
| 16: until all jobs are processed |
| 17: Store the JSeq in memory and calculate the respective makespan, $C_{max}$ and reward R |
| 18: if $C_{max}$ < best_makespan then (predefined criteria based on current makespan computed for the current job sequence for policy updation) |
| 19: best_seq ← JSeq; best_makespan ← $C_{max}$ |
| 20: $Q(s_t, a_t) = R \times Q(s_t, a_t) \ \forall \ (s_t, a_t)$ |
| 21: $Q_{finalref}(s_t, a_t) \leftarrow Q(s_t, a_t)$ |
| 22: Evolutionary crossover module: Latest k JSeq (Parent job sequences) in memory are exposed to below steps: |
| 23: $\lfloor \frac{n}{2} \rfloor$ random job locations were interchanged between two job sequences as in FIG. 3 |
| 24: - Each child sequence is filled with remaining jobs in the leftover location to generate evolved job sequences |
| 25: Evolutionary mutation module: Parent and evolved job sequences from crossover module are exposed to below steps: |
| 26: - k random positions were chosen from random job sequences for mutation |
| 27: - Jobs from chosen position are shifted in sequence as shown in FIG. 4 |
| 28: $JSeq_{evol}$ ← job_seq with minimum makespan from the evolved and parent sequences |
| 29: Estimate the makespan, $C_{max\_evol}$ for $JSeq_{evol}$ |
| 30: Best sequence selection and update module: |
| 31: if $G_{max\_evol}$ < best_makespan then |
| 32: Initialize: s with all jobs |
| 33: repeat for each step t |
| 34: $a_t$ is chosen from $JSeq_{evol}$ successively |
| 35: Estimate $s_{t+1}$ based on $a_t$ |
| 36: Choose $a_{t+1}$ corresponding to $s_{t+1}$ from $JSeq_{evol}$ which is the next job in sequence |
| 37: $Q(s_t, a_t) = Q(s_t, a_t) + \alpha[\gamma Q(s_{t+1}, a_{t+1}) - Q(s_t, a_t)]$ |
| 38: $s_t \leftarrow s_{t+1}; a_t \leftarrow a_{t+1}$ |
| 39: until all jobs are chosen |
| 40: best_seq ← $JSeq_{evol}$; best_makespan ← $C_{max\_evol}$ |

| Algorithm 1 evolved SARSA for solving FSSP |
|---|
| 41. $Q(s_t, a_t) = R \times Q(s_t, a_t) \ \forall \ (s_t, a_t)$ |
| 42.     end if |
| 43.   else if ($C_{max} \leftarrow$ best_makespan then (predefined policy update criteria based on current makespan computed for the current job sequence for policy updation) |
| 44.     if $(s_t, a_t)$ encountered $\notin (s_t, a_t)$ of $Q_{finalref}$ then |
| 45.       $Q(s_t, a_t) = R \times Q_{copy}(s_t, a_t) \ \forall \ (s_t, a_t)$ |
| 46.     else |
| 47.       $Q(s_t, a_t) = Q_{finalref}(s_t, a_t)$ |
| 48.     end if |
| 49.   end if |
| 50. until stopping condition on the episode is reached |
| 51. Heuristics module: Initialize: $T = T_o$, $\beta$ |
| 52. repeat for each iteration |
| 53.   for each K neighbor do |
| 54.     Let $JSeq_k$ be the current neighbor |
| 55.     Estimate makespan $C_k$, $\Phi = C_k -$ best_makespan |
| 56.     if $\Phi < 0$ then |
| 57.       best_seq $\leftarrow JSeq_k$; best_makespan $\leftarrow C_k$ |
| 58.     else |
| 59.       if random number, $r < e^{-\Phi/T}$ then |
| 60.         best_seq $\leftarrow JSeq_k$; best_makespan $\leftarrow C_k$ |
| 61.       end if |
| 62.     end if |
| 63.   end for |
| 64.   $T = \beta \times T$ |
| 65.   if $C_k >$ best_makespan and is same for past t iterations then |
| 66.     $T = \dfrac{T_o}{2}$ |
| 67.   end if |
| 68. until stopping condition |
| 69. Output: best_seq, best_makespan |

Figure 5:
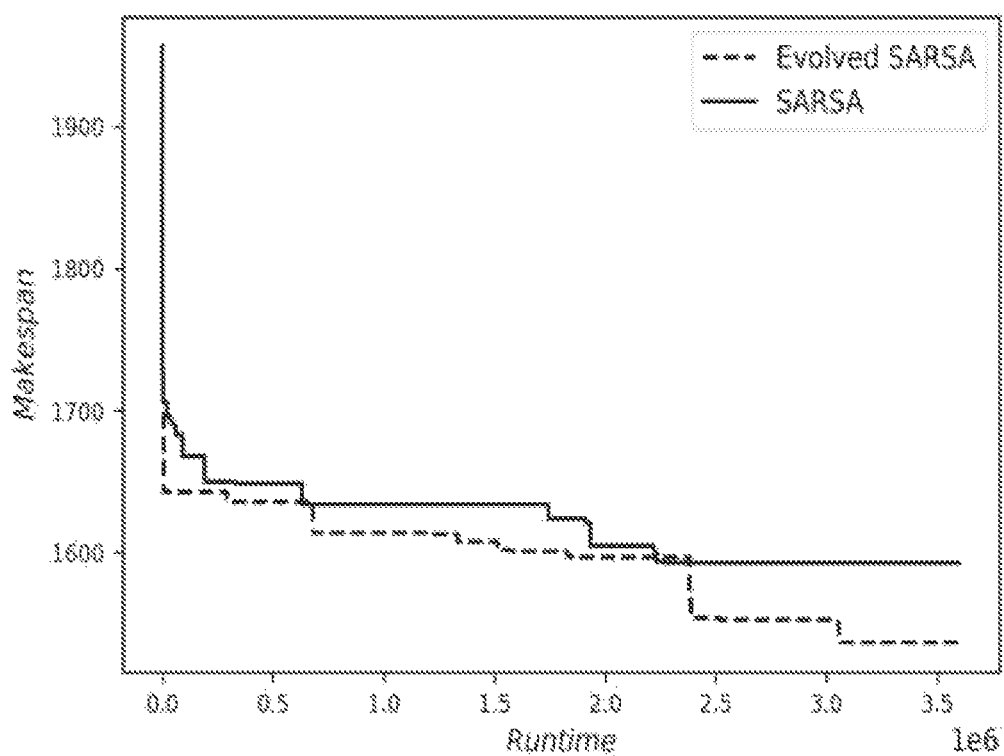
FIGS. 5 through 8 are graphical illustrations depicting performance analysis of the system of FIG. 1, in accordance with some embodiments of the present disclosure.

EXPERIMENTATION AND RESULTS: The hybrid framework of the system 100 in Algorithm 1 is tested using the datasets from Carlier's and Reeves's which were obtained from the standard OR-Library dataset. The dataset considered consists of 9 different problems denoted by reC01, reC03, reC05, reC07, reC09, reC11, reC13, reC15 and reC17 from Reeves's and eight other problems referred as car1-car8 from Carlier's. The optimum makespan, C* for these benchmark datasets was cited in prior works. All experiments were evaluated on a computer with an Intel® Core™ i5-8250U CPU@1.60 GHz-1.80 GHz and 16 GB of RAM. In the experimentation, the makespan was evaluated using the evolved SARSA system disclosed herein, where for every runtime of episodes the solution improved and finally converged to the best makespan (optimum makespan). Consider one of the datasets reC09 of, Reeves's which required 20 jobs to be performed using 10 different machines. FIG. 5 shows the makespan comparison of the evolved SARSA approach disclosed by the system 100 (evolved SARSA system) with traditional SARSA for reC09. The evolved SARSA helps to reach the optimum solution in a lesser runtime which proves the effectiveness of the method disclosed. In the evolved SARSA, the SARSA learning from the R-SARSA learning module helps in finding good actions while the evolution technique along with the heuristics approach containing the local search ability enhances the solution in moving towards the global optimum. Further, the evolved SARSA was compared with different state-of-art algorithms in literature like ODE, PGA, NEN, SA, NEH+SA, NE+SA+GA, GA and SARSA to test the performance of the system 100 for solving the optimal job sequence with minimum makespan. ODE is a discrete differential evolution algorithm, PGA is a permutation based genetic algorithm, NEN is a constructive heuristic, SA is simulated annealing which is motivated by the analogy to annealing in solids. NEH+ SA and NEH+SA+GA as defined in work in literature, GA(Genetic Algorithm) is the evolutionary technique used and SARSA is the on-policy algorithm of Reinforcement learning as defined in equation 6. In this experiment, the performance of different algorithms was compared using the Relative error percentage(REP) defined as:

$$REP = \frac{C_{max} - C^*}{C} \tag{9}$$

where, $C_{max}$ is the best makespan of any algorithm and C* is the theoretical optimum of the makespan. Table I summarizes the computational results of the various algorithm compared against the evolved SARSA.

TABLE I

| Dataset | n × m | C* | ODE | | PGA | | NEH | | SA | |
|---|---|---|---|---|---|---|---|---|---|---|
| | | | $C_{max}$ | REP | $C_{max}$ | REP | $C_{max}$ | REP | $C_{max}$ | REP |
| car1 | 11 × 5 | 7038 | 7038 | 0 | 7038 | 0 | 7038 | 0 | 7038 | 0 |
| car2 | 13 × 4 | 7166 | 7166 | 0 | 7166 | 0 | 7376 | 2.931 | 7166 | 0 |
| car3 | 12 × 5 | 7312 | 7366 | 0.739 | 7399 | 1.19 | 7399 | 1.19 | 7318 | 0.082 |
| car4 | 14 × 4 | 8003 | 8003 | 0 | 8003 | 0 | 8003 | 0 | 8003 | 0 |
| car5 | 10 × 6 | 7720 | 7720 | 0 | 7720 | 0 | 7835 | 1.49 | 7720 | 0 |
| car6 | 8 × 9 | 8505 | 8505 | 0 | 8505 | 0 | 8773 | 3.151 | 8505 | 0 |
| car7 | 7 × 7 | 6590 | 6590 | 0 | 6590 | 0 | 6590 | 0 | 6590 | 0 |
| car8 | 8 × 8 | 8366 | 8366 | 0 | 8366 | 0 | 8564 | 2.367 | 8366 | 0 |
| reC01 | 20 × 5 | 1242 | 1308 | 5.314 | 1283 | 3.301 | 1303 | 4.911 | 1251 | 0.719 |
| reC03 | 20 × 5 | 1109 | 1117 | 0.721 | 1125 | 1.443 | 1132 | 2.074 | 1126 | 1.51 |
| reC05 | 20 × 5 | 1242 | 1257 | 1.208 | 1245 | 0.242 | 1281 | 3.14 | 1259 | 1.35 |

TABLE I-continued

| | | | | | | | | | | |
|---|---|---|---|---|---|---|---|---|---|---|
| reC07 | 20 × 10 | 1566 | 1599 | 2.107 | 1622 | 3.576 | 1626 | 3.831 | 1580 | 0.886 |
| reC09 | 20 × 10 | 1537 | 1592 | 3.578 | 1587 | 3.253 | 1583 | 2.993 | 1556 | 1.221 |
| reC11 | 20 × 10 | 1431 | 1494 | 4.403 | 1476 | 3.145 | 1550 | 8.316 | 1460 | 1.986 |
| reC13 | 20 × 15 | 1930 | 2013 | 4.301 | 1975 | 2.332 | 2002 | 3.731 | 1976 | 2.328 |
| reC15 | 20 × 15 | 1950 | 2028 | 4.000 | 2005 | 2.821 | 2013 | 3.231 | 1987 | 1.862 |
| reC17 | 20 × 15 | 1902 | 2008 | 5.573 | 1960 | 3.049 | 2019 | 6.151 | 1942 | 2.06 |

| | NEH + SA | | NEH + SA + GA | | GA | | SARSA | | Evoled SARSA | |
|---|---|---|---|---|---|---|---|---|---|---|
| Dataset | $C_{max}$ | REP | Cmax | REP | $C_{max}$ | REP | $C_{max}$ | REP | $C_{max}$ | REP |
| car1 | 7038 | 0 | 7038 | 0 | 7038 | 0 | 7038 | 0 | 7038 | 0 |
| car2 | 7166 | 0 | 7166 | 0 | 7166 | 0 | 7166 | 0 | 7166 | 0 |
| car3 | 7312 | 0 | 7312 | 0 | 7312 | 0 | 7340 | 0.383 | 7312 | 0 |
| car4 | 8003 | 0 | 8003 | 0 | 8003 | 0 | 8003 | 0 | 8003 | 0 |
| car5 | 7720 | 0 | 7720 | 0 | 7720 | 0 | 7727 | 0.091 | 7720 | 0 |
| car6 | 8505 | 0 | 8505 | 0 | 8505 | 0 | 8505 | 0 | 8505 | 0 |
| car7 | 6590 | 0 | 6590 | 0 | 6590 | 0 | 6590 | 0 | 6590 | 0 |
| car8 | 8366 | 0 | 8366 | 0 | 8366 | 0 | 8366 | 0 | 8366 | 0 |
| reC01 | 1242 | 0 | 1242 | 0 | 1249 | 0.564 | 1280 | 3.06 | 1247 | 0.403 |
| reC03 | 1113 | 0.361 | 1109 | 0 | 1111 | 0.18 | 1118 | 0.812 | 1109 | 0 |
| reC05 | 1253 | 0.886 | 1246 | 0.322 | 1245 | 0.242 | 1269 | 2.174 | 1245 | 0.242 |
| reC07 | 1574 | 0.511 | 1571 | 0.319 | 1566 | 0 | 1584 | 1.149 | 1566 | 0 |
| reC09 | 1553 | 1.041 | 1541 | 0.26 | 1537 | 0 | 1593 | 3.643 | 1537 | 0 |
| reC11 | 1452 | 1.468 | 1431 | 0 | 1431 | 0 | 1458 | 1.887 | 1431 | 0 |
| reC13 | 1967 | 1.917 | 1935 | 0.259 | 1932 | 0.104 | 1969 | 2.021 | 1930 | 0 |
| reC15 | 1972 | 1.128 | 1953 | 0.154 | 1973 | 1.179 | 1985 | 1.795 | 1951 | 0.051 |
| reC17 | 1936 | 1.788 | 1902 | 0 | 1919 | 0.894 | 1990 | 4.627 | 1902 | 0 |

Figure 6:
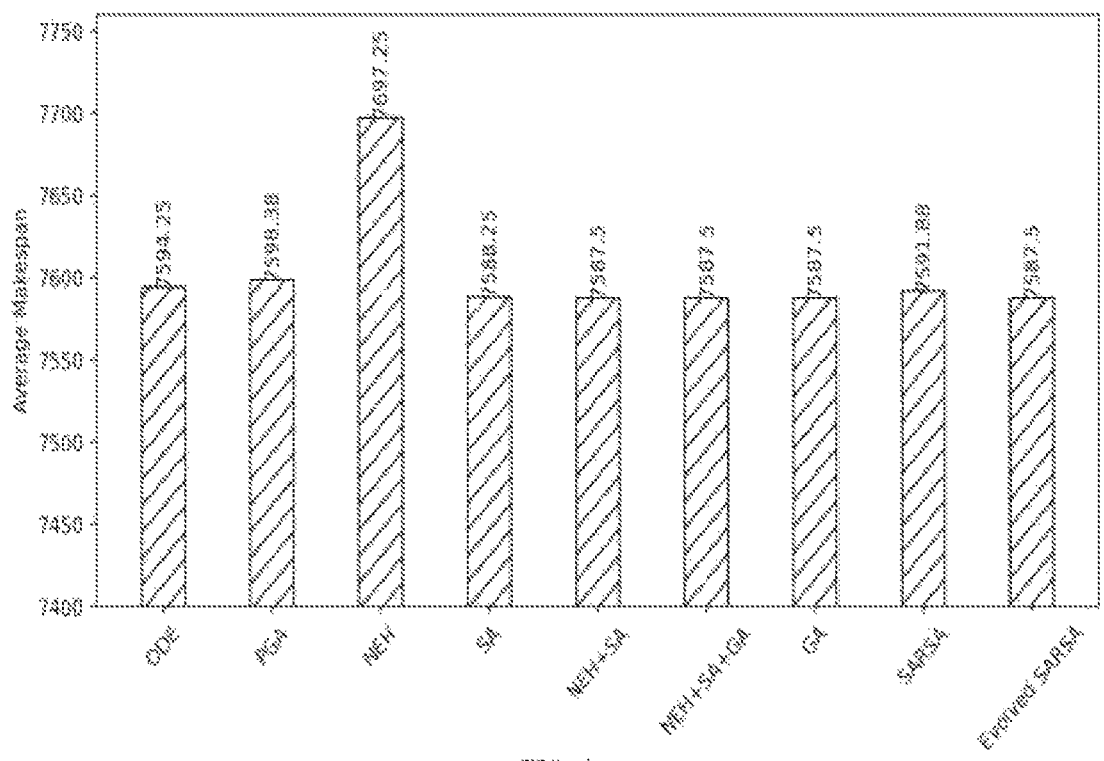
Figure 7:
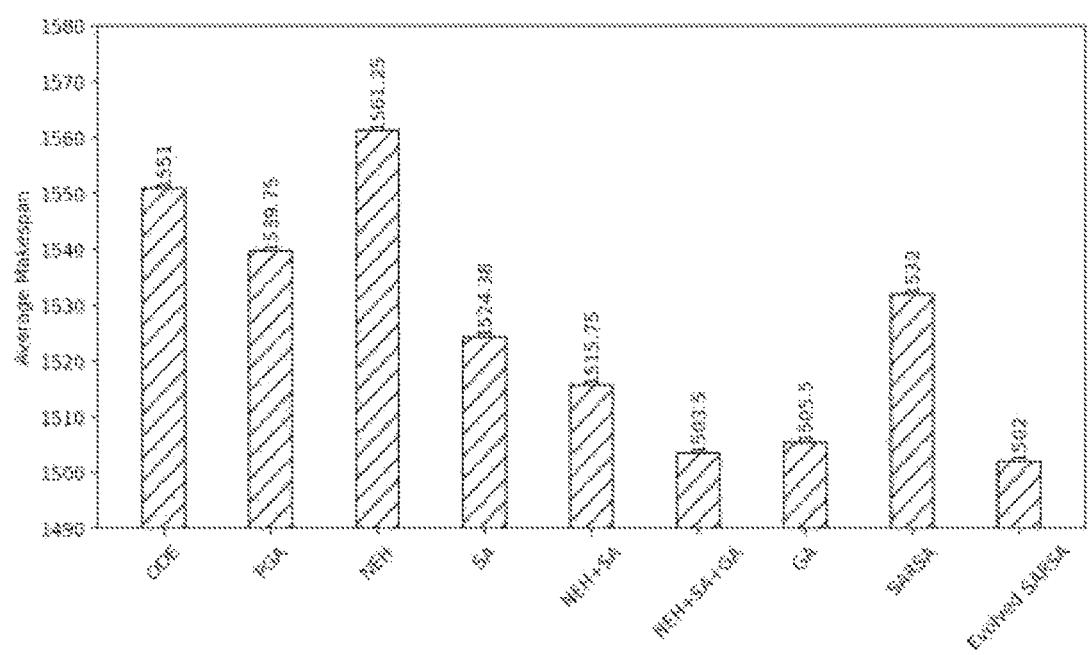
Figure 8:
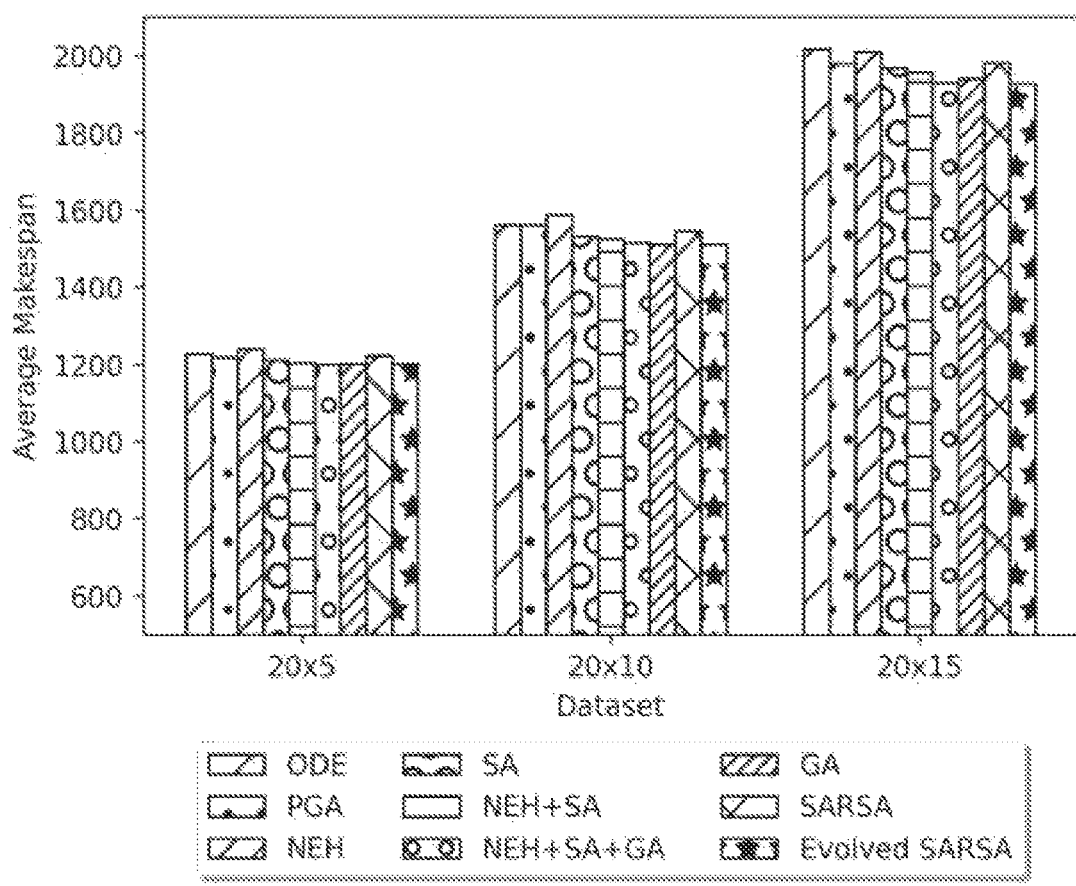

The results of ODE, PGA and NEH are obtained from works in literature. Similarly, SA, NEH+SA and NEH+SA+GA are from another work in literature. The results of GA and SARSA algorithms were self-generated by implementing a framework in the literature. Here the first column represents the dataset name, the second column represents the size of the dataset i.e., jobs×machines. The optimum value of the makespan from the literature is shown in the third column. The fourth to fifteenth columns represent the best makespan and REP for the state-of-the-art algorithms. The sixteenth to nineteenth column shows the results obtained by implementing the respective framework in the literature. The last two columns represent the obtained results of the evolved SARSA. The bold values in Table I against different algorithms represent the best makespan that was estimated for the particular dataset. It is observed that the evolved SARSA outperforms the state-of-the-art algorithms and the makespan estimated is near to the optimum makespan represented in C* column for the majority of the scenarios. FIGS. 6 and 7 summarize the average makespan estimated for Car instances of Carlier's and reC instances of Revees's using different algorithms respectively. Since the algorithm with minimum overall makespan is more efficient, FIGS. 6 and 7 show the superiority of the evolved SARSA. For further analysis, the datasets of Reeves's were grouped based on the number of jobs and machines combination (20×5, 20×10 and 20×15) and average makespan was estimated for each group of the dataset as shown in FIG. 8. It is evident that the evolved SARSA is better as compared to other techniques in each category of the number of jobs. An approach to solving FSSP using traditional SARSA was reported in a work in literature, where the authors had proposed an improvised SARSA known as Expected SARSA based on a neural network and the evaluations were performed on a subset of the OR-Library. However, it was observed the evolved SARSA outperforms the results of Expected SARSA as shown in Table II where the results of Expected SARSA were taken from work in literature. The evolved SARSA system is not only less complex when compared with any neural network solution for scheduling, but it can also be very easily extended to solve any complex problem.

TABLE II

| | | | Expected SARSA | | evolved SARSA | |
|---|---|---|---|---|---|---|
| Dataset | n × m | C* | $C_{max}$ | REP | $C_{max}$ | REP |
| car1 | 11 × 5 | 7038 | 7067 | 0.412 | 7038 | 0 |
| car3 | 12 × 5 | 7312 | 7334 | 0.301 | 7312 | 0 |
| car5 | 10 × 6 | 7720 | 9167 | 18.744 | 7720 | 0 |
| car6 | 8 × 9 | 8505 | 11031 | 29.7 | 8505 | 0 |
| car7 | 7 × 7 | 6590 | 7598 | 15.296 | 6590 | 0 |
| car8 | 8 × 8 | 8366 | 10123 | 21.002 | 8366 | 0 |
| reC01 | 20 × 5 | 1242 | 1257 | 1.208 | 1247 | 0.403 |
| reC03 | 20 × 5 | 1109 | 1116 | 0.631 | 1109 | 0 |
| reC05 | 20 × 5 | 1242 | 1250 | 0.644 | 1245 | 0.242 |
| reC07 | 20 × 10 | 1566 | 2087 | 33.269 | 1566 | 0 |
| reC09 | 20 × 10 | 1537 | 2043 | 32.921 | 1537 | 0 |
| reC11 | 20 × 10 | 1431 | 1976 | 38.085 | 1431 | 0 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The method and system disclosed herein represents a hybrid framework to estimate the optimum job sequence for any FSSP. It is an integration between the RL using SARSA learning and evolution techniques and heuristics approach to improve the search space of the optimal solution and eliminate the solution from being stuck at a local optimum. In scheduling problems as the reward can be estimated only at the episodic end, instead of a standard step-by-step update, a two-step update on the SARSA policy is performed to give feedback. The evolutionary GA technique estimates a better solution on top of the explored and exploited solution from SARSA and is given as feedback to the SARSA policy. The local search ability of SA heuristics and the proposed strategy of resetting the temperature helps in further improving the estimated solution. The evolved SARSA is simple, effective and can be easily extended to any complex scheduling problem. In future, the same concept can be extended to solve job shop problems where multi-agent SARSA learning along with evolution and heuristics has to be implemented to account for the different sequences of jobs across different machines.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for flow shop scheduling, the method comprising:

receiving, by one or more hardware processors, a plurality of jobs to be sequenced during flow shop scheduling on a plurality of machines, wherein the plurality of jobs comprise one or more tasks to be executed sequentially across the plurality of machines and the execution of each job of the plurality of jobs across each machine of the plurality of machines is associated with a processing time;

obtaining, by the one or more hardware processors, an optimum job sequence for the plurality of jobs that has a minimum makespan, by iteratively performing steps further comprising:

obtaining, via a Reinforced State-Action-Reward-State-Action (R-SARSA) learning module executed by the one or more hardware processors, a current job sequence of the plurality of jobs;

identifying, by the one or more hardware processors, the current job sequence as a best job sequence if a current makespan estimated for the current job sequence is less than a preceding makes pan computed for a previous iteration, wherein the current makespan is identified as a best makespan, and if the current makespan is greater than the preceding makespan, a policy learnt by the R-SARSA learning module in the previous iteration is unlearnt and is assigned a penalty for a reward to prevent from drifting away from obtaining the optimum job sequence, and wherein a first makespan estimated in a first iteration is compared with an initial preset best makespan, wherein the initial preset best makespan is a positive number and the first makespan is always less than the initial preset best makespan and unlearning of the R-SARSA learning module in the first iteration is not triggered;

storing, by the one or more hardware processors, the identified best job sequence in a repository, wherein the repository stores a plurality of best sequences identified in each iteration;

generating, via an evolutionary crossover module executed by the one or more hardware processors, a plurality parent job sequence pairs, randomly picked from the plurality of best sequences;

processing, via the evolutionary crossover module each of the plurality of parent job sequence pairs, to generate a plurality of evolved job sequences using genetic operators that switch one or more jobs between each pair of the plurality of parent job sequence pairs, wherein the one or more jobs are associated with N randomly selected positions in a job sequence of each pair among the parent job sequence pairs, wherein, in the evolutionary crossover module, each of identified best job sequences, is referred to as chromosomes, from the repository are encoded as possible set of job sequences, and each identified best job sequences is exposed to crossover considering two random job sequences or populations, and produce two new child populations;

applying a mutation technique, via a mutation module executed by the one or more hardware processors, on the plurality of evolved job sequences to generate a plurality of mutated job sequences by sequentially shifting k random positions of one or more jobs within each of the plurality of evolved job sequences; and identifying a job sequence as the optimum job sequence from among the plurality of parent job sequence pairs and the plurality of mutated job sequences that has the minimum makespan, wherein a policy of the R-SARSA learning module is updated accordingly if the optimum job sequence is different than the best job sequence identified by the R-SARSA learning module, and wherein the best makespan is greater than the minimum makespan;

applying minor perturbations to the optimum job sequence, via a heuristics module executed by the one or more hardware processors, to generate a set of neighbor job sequences; and evaluating a neighbor makespan of each of the set of neighbor job sequences in accordance with predefined heuristic criteria, wherein if a minimum neighbor makespan among the neighbor makespan evaluated for each of the set of neighbors is constant for past predefined iterations, then a temperature parameter of the heuristics module is reset to half of an initial value, which prevents the optimum job sequence from being stuck at a local optimum and enables the optimum job sequence to reach a global optimum, wherein the heuristics module starts from an initial temperature and randomly finds the global optimum by decreasing the temperature parameter simultaneously at a predefined annealing rate, and retaining all makespan in the repository estimated over iterations, wherein the R-SARSA learning module is extended to solve job shop problems deploying multi-agent SARSA learning along with evolution and heuristics implemented for varied sequence of jobs across varied machines.

2. The method of claim 1, wherein the policy update of the R-SARSA learning module is a two-step process of initially updating Q-values without the reward in each iteration of an episode of the R-SARSA learning module, and further updating the Q-values after estimating the reward at end of each episode of the R-SARSA learning module in accordance with predefined criteria based on the current makespan estimated for the current job sequence.

3. A system for flow shop scheduling, the system comprising:

a memory storing instructions;

one or more Input/Output (I/O) interfaces; and one or more hardware processors coupled to the memory via the one or more I/O interfaces, wherein the one or more hardware processors are configured by the instructions to:

receive a plurality of jobs to be sequenced during flow shop scheduling on a plurality of machines, wherein the plurality of jobs comprise one or more tasks to be executed sequentially across the plurality of machines and the execution of each job of the plurality of jobs across each machine of the plurality of machines is associated with a processing time;

obtain an optimum job sequence for the plurality of jobs that has a minimum makespan, by iteratively performing steps further comprising:

obtaining via a Reinforced State-Action-Reward-State-Action (R-SARSA) learning module executed by the one or more hardware processors, a current job sequence of the plurality of jobs;

identifying the current job sequence as a best job sequence if a current makespan estimated for the current job sequence is less than a preceding makespan computed for a previous iteration, wherein the current makespan is identified as a best makespan, and wherein if the current makespan is greater than the preceding makespan, a policy learnt by the R-SARSA learning module in the previous iteration is unlearnt and is assigned a penalty for a reward to prevent from drifting away from obtaining the optimum job sequence, and wherein in a first makespan estimated in a first iteration is compared with an initial preset best makespan, wherein the initial preset best makespan is a positive number and the first makespan is always less than the initial preset best makespan and unlearning of the R-SARSA learning module in the first iteration is not triggered;

storing the identified best job sequence in a repository, wherein the repository stores a plurality of best sequences identified in each iteration;

generating via an evolutionary crossover module executed by the one or more hardware processors, a plurality parent job sequence pairs, randomly picked from the plurality of best sequences;

processing via the evolutionary crossover module each of the plurality of parent job sequence pairs, to generate a plurality of evolved job sequences using genetic operators that switch one or more jobs between each pair of the plurality of parent job sequence pairs, wherein the one or more jobs are associated with N randomly selected positions in a job sequence of each pair among the parent job sequence pairs, wherein, in the evolutionary crossover module, each of identified best job sequences, is referred to as chromosomes, from the repository are encoded as possible set of job sequences, and each identified best job sequences is exposed to crossover considering two random job sequences or populations, and produce two new child populations;

applying a mutation technique, via a mutation module executed by the one or more hardware processors, on the plurality of evolved job sequences to generate a plurality of mutated job sequences by sequentially shifting k random positions of one or more jobs within each of the plurality of evolved job sequences; and identifying a job sequence as the optimum job sequence from among the plurality of parent job sequence pairs and the plurality of mutated job sequences that has the minimum makespan, wherein a policy of the R-SARSA learning module is updated accordingly if the optimum job sequence is different than the best job sequence identified by the R-SARSA learning module, and wherein the best makespan is greater than the minimum makespan;

apply minor perturbations to the optimum job sequence, via a heuristics module executed by the one or more hardware processors, to generate a set of neighbor job sequences; and evaluate a neighbor makespan of each of the set of neighbor job sequences in accordance with predefined heuristic criteria, wherein if a minimum neighbor makespan among the neighbor makespan evaluated for each of the set of neighbors is constant for past predefined iterations, then a temperature parameter of the heuristics module is reset to half of an initial value, which prevents the optimum job sequence from being stuck at a local optimum and enables the optimum job sequence to reach a global optimum, wherein the heuristics module starts from an initial temperature and randomly finds the global optimum by decreasing the temperature parameter simultaneously at a predefined annealing rate, and retaining all makespan in the repository estimated over iterations, wherein the R-SARSA learning module is extended to solve job shop problems deploying multi-agent SARSA learning along with evolution and heuristics implemented for varied sequence of jobs across varied machines.

4. The system of claim 3, wherein the policy update of the R-SARSA learning module is a two-step process of initially updating Q-values without the reward in each iteration of an episode of the R-SARSA learning module, and further updating the Q-values after estimating the reward at end of each episode of the R-SARSA learning module in accordance with predefined criteria based on the current makespan estimated for the current job sequence.

5. One or more non-transitory machine-readable information storage mediums comprising one or more instructions which when executed by one or more hardware processors cause:

receiving a plurality of jobs to be sequenced during flow shop scheduling on a plurality of machines, wherein the plurality of jobs comprise one or more tasks to be executed sequentially across the plurality of machines and the execution of each job of the plurality of jobs across each machine of the plurality of machines is associated with a processing time;

obtaining an optimum job sequence for the plurality of jobs that has a minimum makespan, by iteratively performing steps further comprising:

obtaining, via a Reinforced State-Action-Reward-State-Action (R-SARSA) learning module executed by the one or more hardware processors, a current job sequence of the plurality of jobs;

identifying the current job sequence as a best job sequence if a current makespan estimated for the current job sequence is less than a preceding makespan computed for a previous iteration, wherein the current makespan is identified as a best makespan, and if the current makespan is greater than the preceding makespan, a policy learnt by the R-SARSA learning module in the previous iteration is unlearnt and is assigned a penalty for a reward to prevent from drifting away from obtaining the optimum job sequence, and wherein a first makespan estimated in a first iteration is compared with an initial preset best makespan, wherein the initial preset best makespan is a positive number and the first makespan is always less than the initial preset best makespan and unlearning of the R-SARSA learning module in the first iteration is not triggered;

storing the identified best job sequence in a repository, wherein the repository stores a plurality of best sequences identified in each iteration;

generating, via an evolutionary crossover module executed by the one or more hardware processors, a plurality parent job sequence pairs, randomly picked from the plurality of best sequences;

processing, via the evolutionary crossover module each of the plurality of parent job sequence pairs, to generate a plurality of evolved job sequences using genetic operators that switch one or more jobs between each pair of the plurality of parent job sequence pairs, wherein the one or more jobs are associated with N randomly selected positions in a job sequence of each pair among the parent job sequence pairs, wherein, in the evolutionary crossover module, each of identified best job sequences, is referred to as chromosomes, from the repository are encoded as possible set of job sequences, and each identified best job sequences is exposed to crossover considering two random job sequences or populations, and produce two new child populations;

applying a mutation technique, via a mutation module executed by the one or more hardware processors, on the plurality of evolved job sequences to generate a plurality of mutated job sequences by sequentially shifting k random positions of one or more jobs within each of the plurality of evolved job sequences; and identifying a job sequence as the optimum job sequence from among the plurality of parent job sequence pairs and the plurality of mutated job sequences that has the minimum makespan, wherein a policy of the R-SARSA learning module is updated accordingly if the optimum job sequence is different than the best job sequence identified by the R-SARSA learning module, and wherein the best makespan is greater than the minimum makespan;

applying minor perturbations to the optimum job sequence, via a heuristics module executed by the one or more hardware processors, to generate a set of neighbor job sequences; and evaluating a neighbor makespan of each of the set of neighbor job sequences in accordance with predefined heuristic criteria, wherein if a minimum neighbor makespan among the neighbor makespan evaluated for each of the set of neighbors is constant for past predefined iterations, then a temperature parameter of the heuristics module is reset to half of an initial value, which prevents the optimum job sequence from being stuck at a local optimum and enables the optimum job sequence to reach a global optimum, wherein the heuristics module starts from an initial temperature and randomly finds the global optimum by decreasing the temperature parameter simultaneously at a predefined annealing rate, and retaining all makespan in the repository estimated over iterations, wherein the R-SARSA learning module is extended to solve job shop problems deploying multi-agent SARSA learning along with evolution and heuristics implemented for varied sequence of jobs across varied machines.

6. The one or more non-transitory machine-readable information storage mediums of claim 5, wherein the policy update of the R-SARSA learning module is a two-step process of initially updating Q-values without the reward in each iteration of an episode of the R-SARSA learning module, and further updating the Q-values after estimating the reward at end of each episode of the R-SARSA learning module in accordance with predefined criteria based on the current makespan estimated for the current job sequence.

* * * * *